United States Patent [19]
Nagai

[11] 3,746,204
[45] July 17, 1973

[54] HOLLOW DOUBLE-WALL ARTICLE

[75] Inventor: Tomomasu Nagai, Tokyo, Japan

[73] Assignee: Kyoraku Kogyo Co., Ltd., Kamigyo-ku, Japan

[22] Filed: Oct. 20, 1971

[21] Appl. No.: 190,956

Related U.S. Application Data
[62] Division of Ser. No. 32,109, April 27, 1970.

[52] U.S. Cl.................. 220/9 R, 215/6, 215/13, 220/9 F, 220/4 E
[51] Int. Cl............................................. B65d 25/18
[58] Field of Search.............. 220/9 R, 9 F, 9 C, 220/10, 15, 4 R, 4 B, 4 E, 5 A; 206/46 FC; 215/6, 13

[56] References Cited
UNITED STATES PATENTS

| | | | |
|---|---|---|---|
| 1,041,347 | 10/1912 | Potter | 220/10 |
| 1,161,092 | 11/1915 | Wardell | 215/13 R |
| 1,688,959 | 10/1928 | Brooks | 220/9 R |
| 2,624,451 | 1/1953 | Ewing | 220/15 X |
| 2,746,634 | 5/1956 | Smith | 215/6 X |
| 2,750,064 | 6/1956 | Clarke | 220/10 X |
| 3,403,713 | 10/1968 | Good et al. | 220/9 R X |

FOREIGN PATENTS OR APPLICATIONS

| | | | |
|---|---|---|---|
| 1,056,348 | 10/1953 | France | 220/10 |
| 330,940 | 12/1920 | Germany | 215/13 R |
| 866,346 | 2/1953 | Germany | 220/9 R |
| 333,379 | 11/1958 | Switzerland | 220/9 R |

*Primary Examiner*—Samuel B. Rothberg
*Assistant Examiner*—James R. Garrett
*Attorney*—Dawson, Tilton, Fallon & Lungmus

[57] ABSTRACT

A hollow double-wall article produced by a method at least consisted of positioning at least two tubular plasticized parisons of plastic material at opposite sides of at least one core of a mold, closing half-molds of the mold about the parisons and the core to enclose said parisons within a molding cavity defined by the half-molds and the core, and introducing fluid pressure medium into the parisons, said article including at least two plastic hollow sections being independent of each other which are welded together at one or more adjacent parts thereof, said welding being performed by welding the outer surfaces, together, at least two expanded parisons which are independent of each other, at adjacent parts thereof.

2 Claims, 22 Drawing Figures

Patented July 17, 1973

Patented July 17, 1973

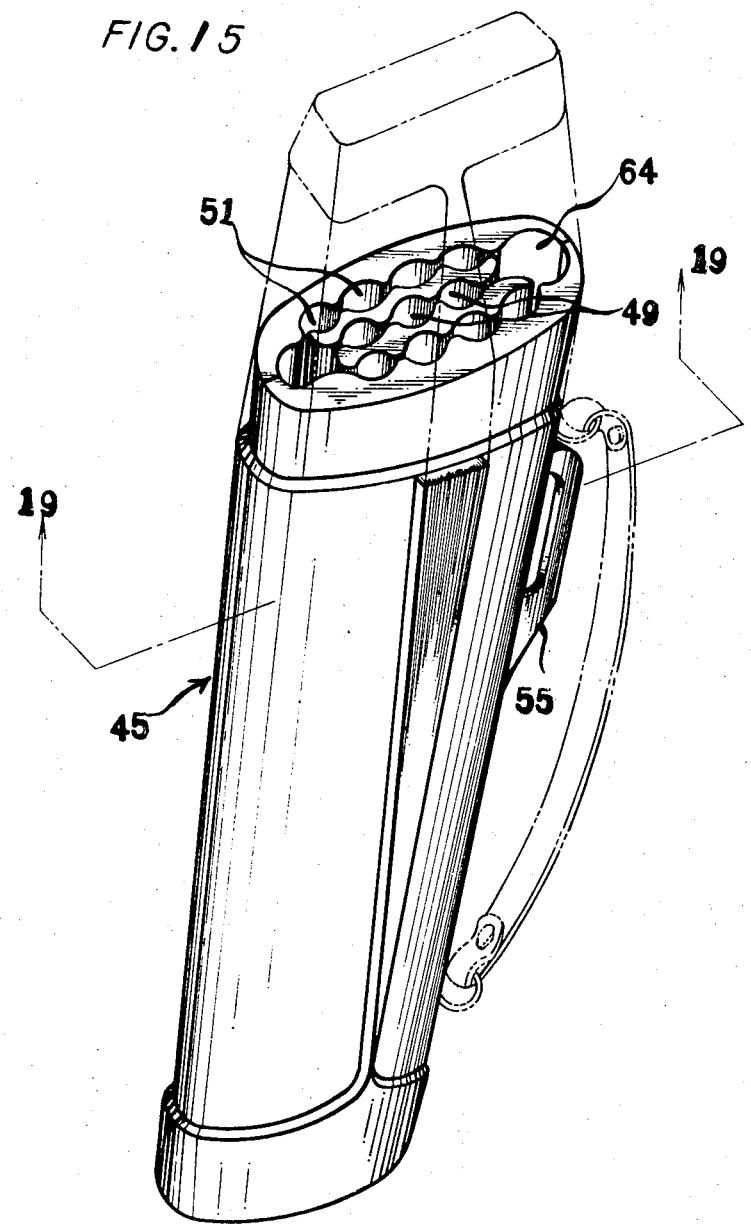

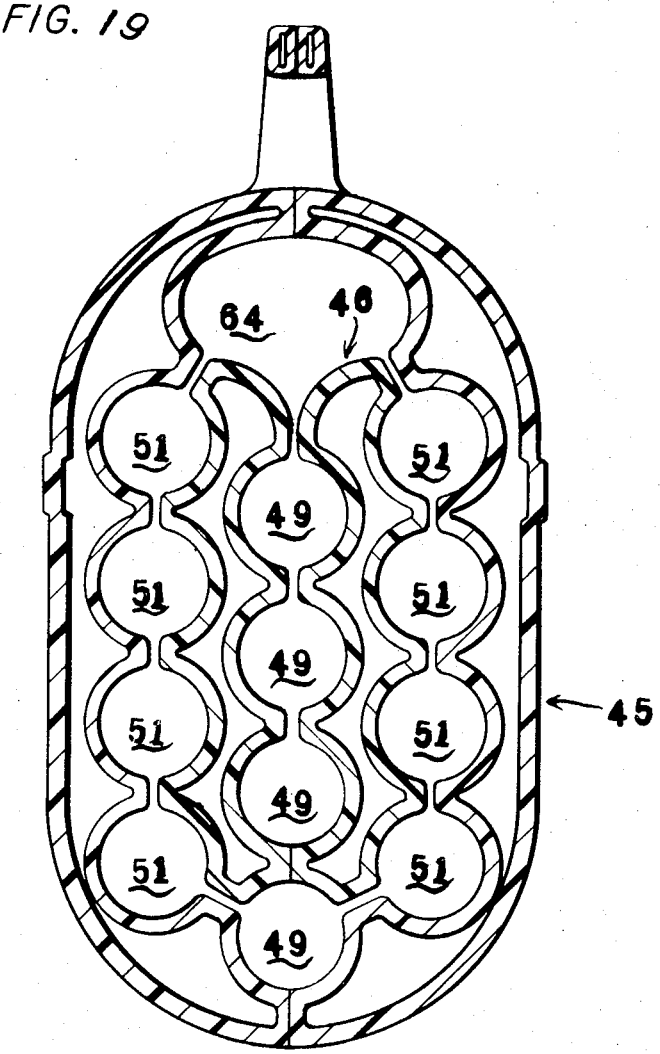

Patented July 17, 1973  3,746,204

HOLLOW DOUBLE-WALL ARTICLE

RELATED APPLICATION

This application is a division of my prior copleading application entitled "A Hollow Double-Wall Article," U.S. Pat. Ser. No. 32,109, filed Apr. 27, 1970.

The present invention relates to a method and an apparatus for forming a hollow, double-wall plastic article such, for example, as the container suitable for heat-insulation, the palette, the buoy, the caddy bag and the like, and more particularly to a new and improved method and an improved apparatus for economically efficiently producing such article from a plurality of tubular parisons of plastic material in one blow-molding operation.

At the present time it has been known to form the hollow, double-wall construction such as bottles or the like by using blow-molding means in which the plastic material is extruded from a dual nozzle in the form of a dual tubular parison which is of an inner parison section and an outer parison section coaxially surrounded the inner parison section and which has fluid pressure medium between the parison sections to prevent undesirable welding of the both sections.

The said means is suitable for forming simple, small articles such as cylindrical bottles of circular shape in cross-section, but being not adequate to manufacture the somewhat complicated, double-wall articles such, for example, as rectangular or polygonal articles or the like. Further, construction of the die head having the said dual nozzle for extruding the dual parison is obliged to be much complicated. Moreover, the dual parison having extrapped fluid pressure medium between the parison sections is too much difficult to maintain itself in the proper, controlled working condition.

Accordingly, the one object of the present invention is to provide an unique improved method and an improved apparatus for forming the unitary structure of the larger sized hollow article provided with double-wall from at least two parisons of plastic material in one blow-molding operation. The subject invention is particularly applicable to the formation of structure of the described and other similar structures wherein cheapness as to cost, light weight, self-supporting rigidity and strength sufficient to fulfill the purpose of the structures, ease of fabrication, and high strength to weight ratio are advantageously combined.

Another object of the invention is to provide an apparatus for molding the unitary structure of the hollow, double-wall article having at least one welded portion between inner and outer walls thereof, said welded portion being substantially formed at adjacent parts of two parisons to integrally fuse one another, while providing enhanced reinforcement of the double-wall article.

In carrying out the invention in one aspect thereof, a method for forming a hollow double-wall plastic article is provided in which the process comprises the steps of positioning at least two tubular plasticized parisons of thermoplastic material on opposite sides of at least one core of the mold, closing half-molds of the mold about the parisons and the core to enclose said parisons within a molding cavity defined by the half-molds and the core, and to pinch off excess parts of the parisons, blowing the parisons into contact with the cavity faces by introducing fluid pressure meidum into the parisons thereby welding the expanded parisons to each other on adjacent portions with heat and internal pressure so as to form an integral unitary article, and removing the article from the mold after the article is sufficiently cured by cooling the mold.

Said parisons are preferably extruded from appropriate nozzles of extruder apparatus under semi-molton condition. If desired, air trapped between the parisons to be expanded and the cavity faces of the mold may be withdrawn prior to expansion of the parisons.

Further the apparatus for performing this improved method has been built and being in successful operation. A pair of extrusion nozzles in the apparatus are disposed parallel to each other through which semi-molten plastic materials are downwardly extruded in the form of tubular parisons. Disposed under the extrusion nozzles is a mold comprising a pair of half-molds and at least one core member, said half-molds being movably arranged around the core member so as to assume open and close positions. In the open position of the half-molds, one of the extruded parisons is disposed between the one half-mold and the core member, and other parison between the other half-mold and the core member. The said mold is provided with a molding cavity defined by the inner surface of the half-molds and the outer surface of the core member in the close position for enclosing the parisons. To introduce fluid pressure medium into the enclosed parisons the conventional suitable means is provided. During the expanding stage of the parisons within the cavity of the mold, said two parisons are sufficiently welded to each other at adjacent portions thereof whereby hollow, double-wall article can be obtained as an integral unitary structure.

Other object and advantages of the subject invention will become apparent from reading the following detailed description and by reference to the accompanying drawings wherein:

FIG. 15 is a persective view, partially broken away, of a caddy bag produced by the method and apparatus with an appropriate mold;

FIG. 19 is an enlarged cross-sectional view of the caddy bag taken along the line 19—19 in FIG. 15;

Figure 1:
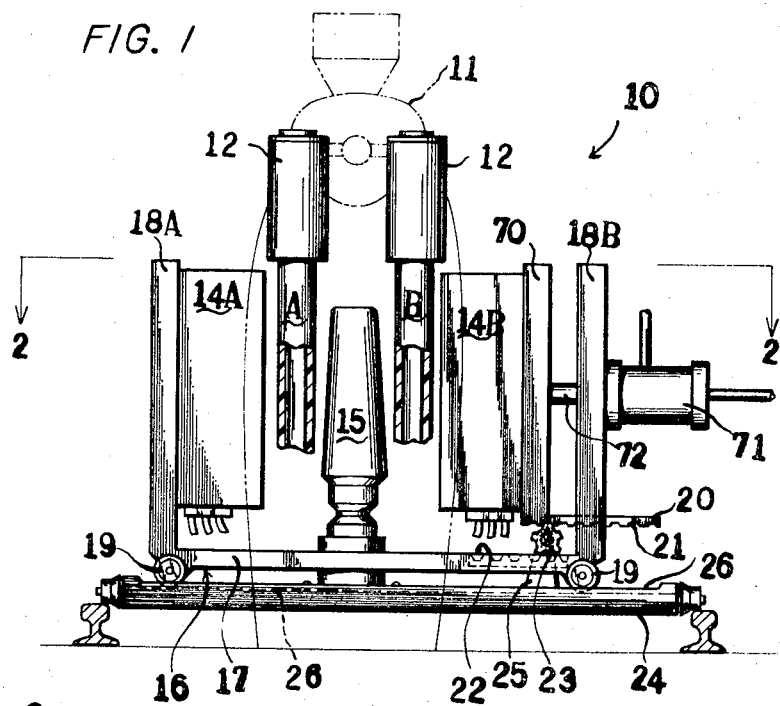
FIG. 1 is a front view of the blow-molding apparatus according to the present invention.

Referring now to the drawings 1 to 4 wherein like numerals have been employed to designate similar parts throughout the various figures, it well be seen that one embodiment of the blow molding apparatus according to the present invention is illustrated by the numeral 10.

The apparatus 10 includes a conventional extruder 11 having a pair of die heads 12 spaced apart from each other. Each of the die heads 12 is provided with a loop-like opening or nozzle (not shown) through which the thermoplastic material, for example, as polyvinyl chloride, polyethylene, polypropylene, polystyrene, A.B.S. resin or the like is continuously downwardly extruded under semi-molten condition in the form of a tubular parison.

Figure 2:
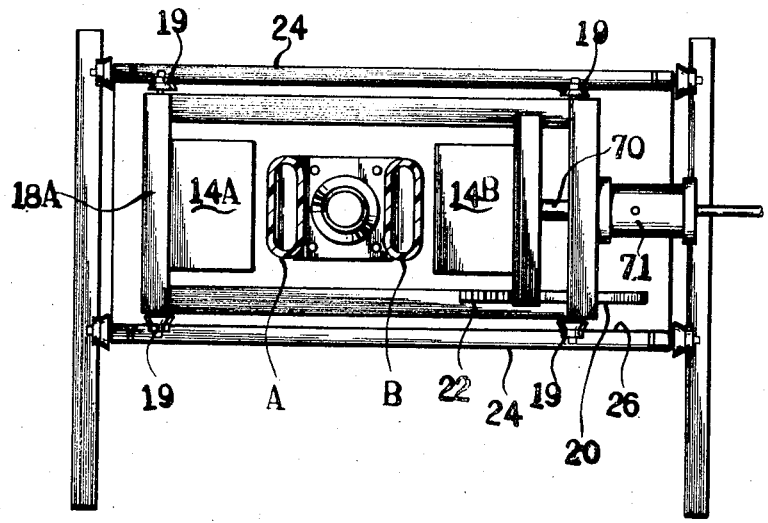
FIG. 2 is a plan view, taken along the line 2—2 in FIG. 1, of the apparatus according to the present invention.

In order to maintain the material being extruded at the proper working condition, the die heads may be heated by any conventional means such as electric heater (not shown) and the like. Preferably, the openings each is provided with not circular but laterally elongated, oblong shape, so that each of the tubular parisons extruded from the corresponding openings may be a laterally elongated, oblong form in cross section thereof as shown in FIG. 2.

Under the die heads a mold is disposed. The mold comprises a pair of complementary half-molds 14A and 14B, and a stational core 15 positioned therebetween. The said half-molds are arranged for movement into and out of engagement about parisons extruded from the die heads. In this way, it is desirable to move both half-molds simultaneously and at syncronous speed. Therefore, in the embodiment shown in the FIGS. 1 and 2, said half-molds 14A and 14B are supported by a moving frame 16 comprising a horizontal base portion 17, a pair of elevational portions 18A and 18B upwardly extended from the ends of the base portion 17, respectively, and wheels 19 rotatably installed to the under surface of the base portion 17 at each corner thereof. One of the half-molds is secured to the one elevational portion 18A and other mold 14B to a moving platen 70 supported by a plunger 72 which co-operates with a cylinder 71 actuated by suitable pressure fluid medium and secured to the other elevational portion 18B. The said moving platen 70 has at lower end thereof a horizontal rack plate 20 having a first rack 21 spaced apart from a second rack 22 which is partially formed on the upper surface of the base portion 17. Between the first and the second racks a pinion wheel 23 is interposed in engagement with both racks, said pinion wheel 23 being supported rotatably by a stay 25 secured on a carrier 24. The said wheels 19 of the moving frame 16 are ridden on rails 26, formed on the upper surface of the carrier 24 and elongated along the same direction with that of the movement of the half-molds.

From the above mentioned arrangement, it will be understood that when the cylinder 71 is actuated by pressure fluid medium two complementary half-molds can be simultaneously at syncronous speed moved to assume positions in which they are close to and at a distance from one another.

Figure 3:
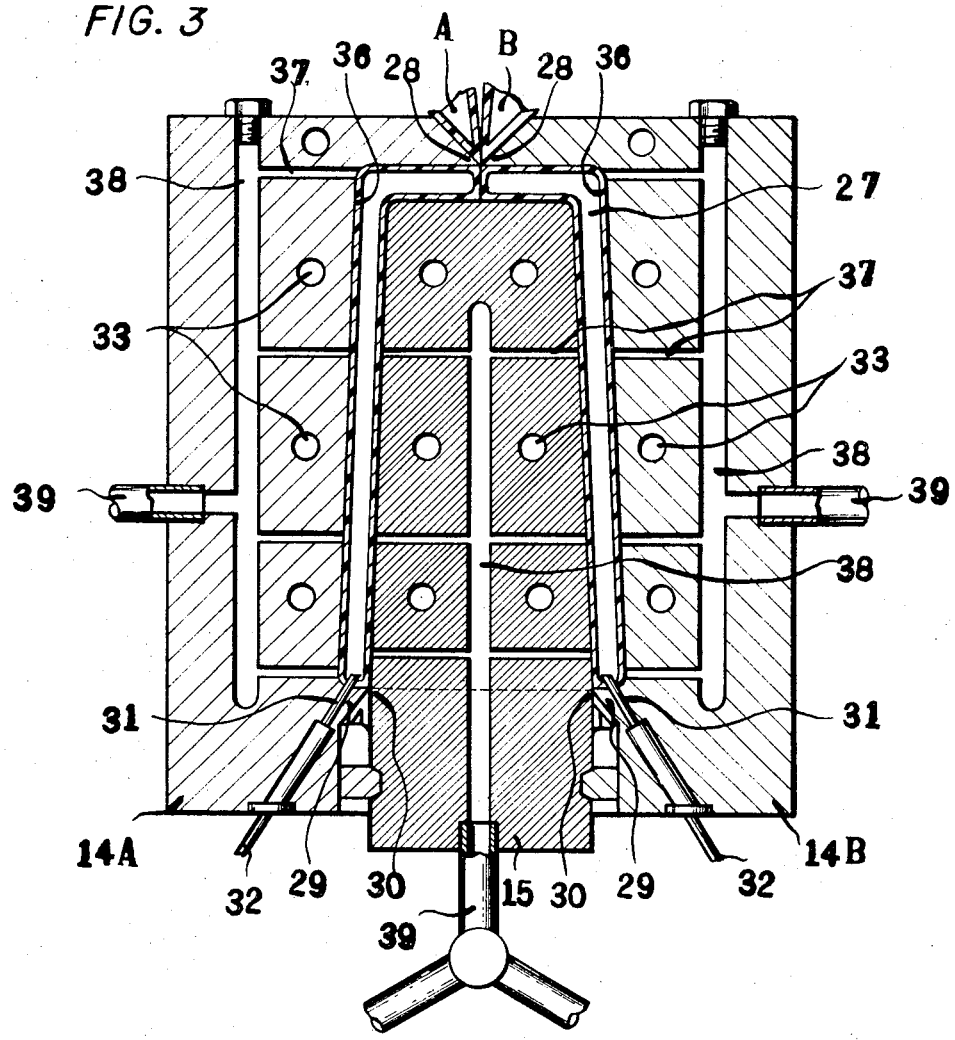
FIG. 3 is a vertical sectional view, on an enlarged scale, of the mold in the apparatus according to the present invention in which the mold is in the closed condition about the parisons.

In accordance with the present invention, thus, one of the extruded parison A is passed between left-hand half-mold 14A and the stational core 15 and the other parison B between right-hand half-mold 14B and the stational core 15. Each of the half-molds is recessed at 36 to define the outer shell configuration of the article which is to be molded, and the stational core 15 being adapted to define the inner shell portion of the article. Thus, half-molds 14A, 14B, when engaged, will define a molding chamber or cavity 27 between the inner surfaces of the half-molds and the outer surface of the stational core 15 as shown in FIG. 3. At upper portion the half-molds 14A and 14B are provided with opposite knife-edge formation 28, respectively, which are arranged to pinch off the parisons A and B therebetween. Each of the half-molds also has at lower portion thereof a lower knife-edge formation 29 which engages with a circular surface of the core 15 to pinch off the parisons therebetween.

Upon closing half-molds 14A, 14B about the two extruded parisons with the stational core, a portion of each of parisons is enclosed within the cavity 27. The half-molds will pinch off the upper end of the enclosed portion and simultaneously pinch off the lower end of the enclosed portion under assistance of the circular surface of the core 15 as shown in FIG. 3. The half-molds 14A and 14B carry means for introducing expansion fluid into each enclosed portion or hollow parison section, said means comprising a pair of needles 31 which are mounted on half-molds 14A and 14B, respectively. Each needle 31 is projected into the interior of the correspond, hollow parison section through the wall thereof.

A source of compressed air is connected via conduits 32 to each needle, for introducing compressed air into each of the hollow parison sections, thereby expanding them into engagement with the cavity walls, while causing the parison sections to assume the shape of the cavity. Prior to the expanding step, pre-blow of the parisons is conducted, if necessary. In the expanded condition each parison section forms half-portion of an article or container to be produced and being welded to one another at adjacent portions thereof against the other parisons section by the effect of the heat and the internal pressure. The half-molds 14A, 14B and the stational core 15 are cooled, as by cooling water ducts 33 connected to a suitable source of cooling fluid. This cools and sets the molded plastic, causing it to retain the mold configuration, whereby an open-topped double-wall container as shown in FIGS. 5 to 10 easily obtained.

In the illustrated container, the inner wall or shell 34 is approached to the outer wall or shell 35 much closely. As the result, a problem of undesirable welding together is duly arisen. There is a tendency that the parisons collapse at the upper portion of the half-molds as the latter closes about the parisons and the stational core 15. If this occurs, at any point, the opposite wall portions of the parisons weld together, preventing subsequent expansion in the mold cavity. Therefore, the means are provided for controlling those portions of the parisons intended to engage the faces of the cavity 27. The desirable control is provided by evacuating on withdrawing air from between the cavity faces and the adjacent wall sections of the enclosed parisons. This may be accomplished in various ways. In the illustrated embodiment, air is withdrawn from between the cavity faces and the adjacent wall sections of the enclosed parisons via vacuum passages 37 which are provided with extremely small diameter, e.g. 0.5 mm and which communicate with a manifold passage 38 through the half-molds 14A, 14B and the stational core 15. Each of the manifold passages 38 communicates with an appropriate source of suction through a conduit 39.

When the half-molds 14A and 14B are closed about the parisons, air is withdrawn from between the parisons and the cavity faces of the mold. All to be required is to relieve the pressure of air trapped between the parisons and the cavity faces, which traps while if otherwise air prevents the parisons from following the contour of the cavity 27 as the half-molds are closed about the parisons and the stational core 15. The passages 37 are so small as to prevent the passage of plastic material therethrough, while being sufficient to permit the desirable withdrawal of air. The withdrawal is conducted as the half-molds 14A and 14B close about the extruded parison, prior to the introduction of expansion fluid through the needles 31. The conduits 39 for the passages 37 also are communicated to the source of expansion fluid via a suitable changeable value, so that the obtained product or container can be easily removed from the cavity faces by applying the pressure of fluid between the outer wall of the container and the cavity faces.

Figure 4:
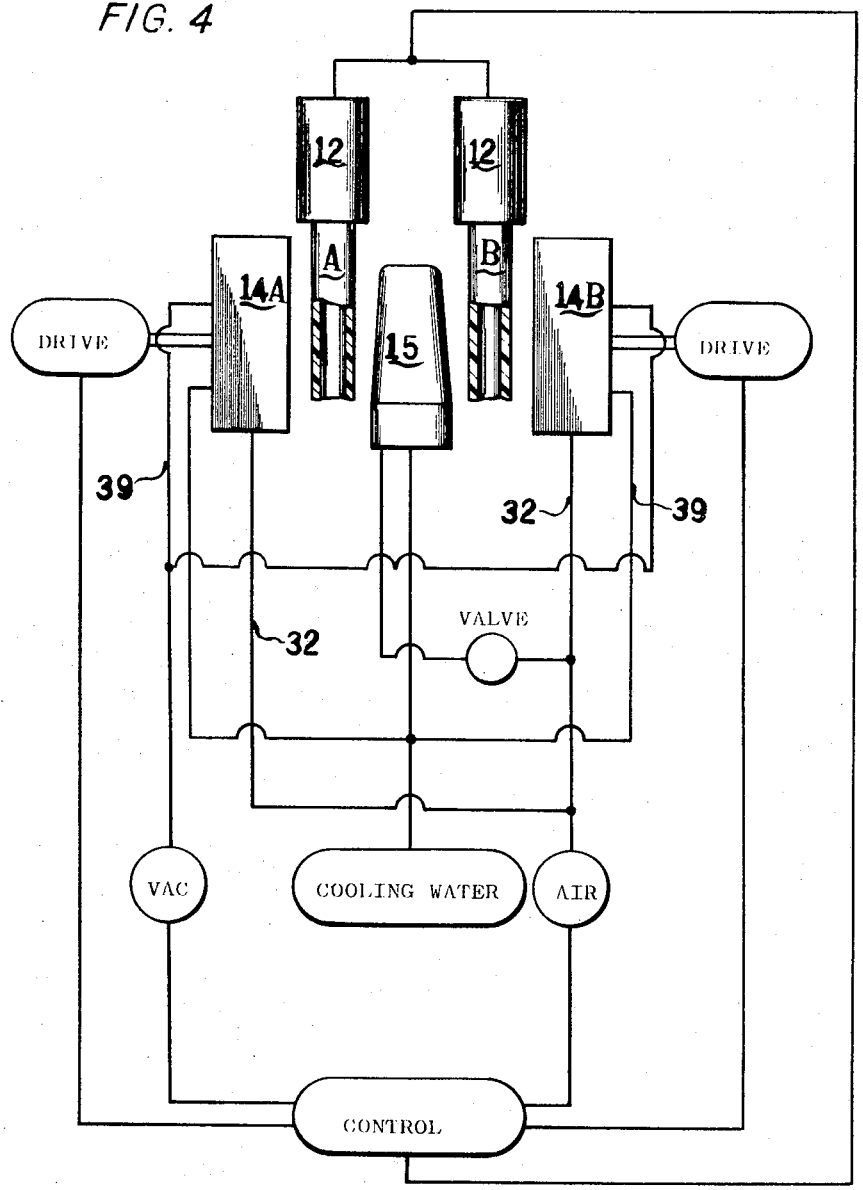
FIG. 4 is a schematic layout of the apparatus according to the present invention.

The feeding of the raw plastic material, the opening and closing of the half-molds and the heating and cooling thereof, the withdrawal of air from between the enclosed parisons and the cavity of the mold, the introduction of expansion fluid and the feeding of the pressure of fluid between the product and the cavity face all are controlled by suitable programming means. The said controls are conventional, and therefore are only schematically indicated in FIG. 4. It will be understood that the illustrated arrangement of the cooling water ducts 33 and the vacuum passages 37 is shematic, and that the same are provided in sufficient numbers at proper locations to achieve the desirable result.

Figure 5:
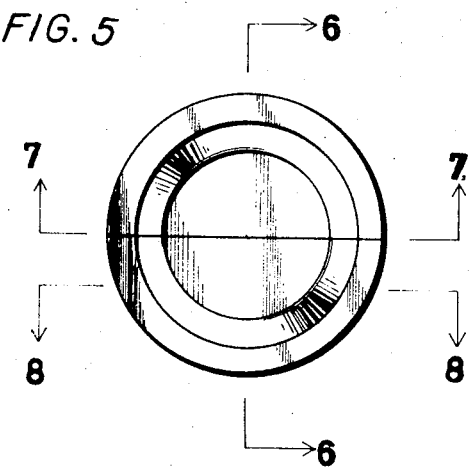
FIG. 5 is a plan view of the container produced by the method and apparatus according to the present invention.
Figure 9:
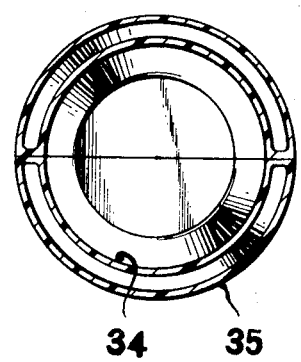
FIG. 9 is a cross-sectional view of the container taken along the line 9—9 in FIG. 6.
Figure 6:
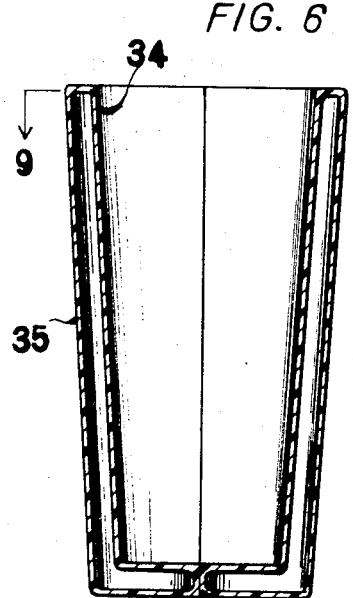
FIG. 6 is a vertical sectional view of the container taken along the line 6—6 in FIG. 5.
Figure 7:
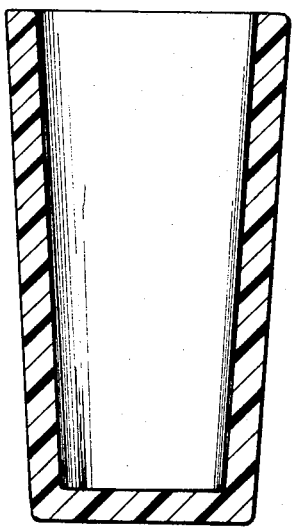
FIG. 7 is a vertical sectional view of the container taken along the line 7—7 in FIG. 5.
Figure 8:
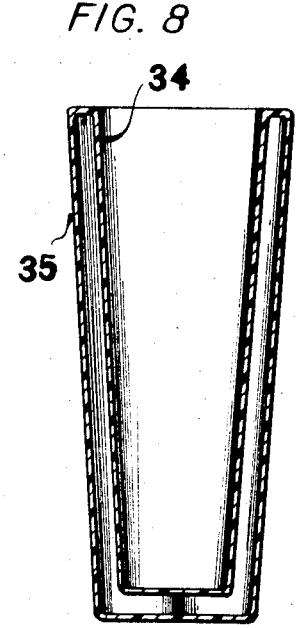
FIG. 8 is a similar view to the FIG. 6, but being sectioned taken along the line 8—8 in FIG. 5.
Figure 10:
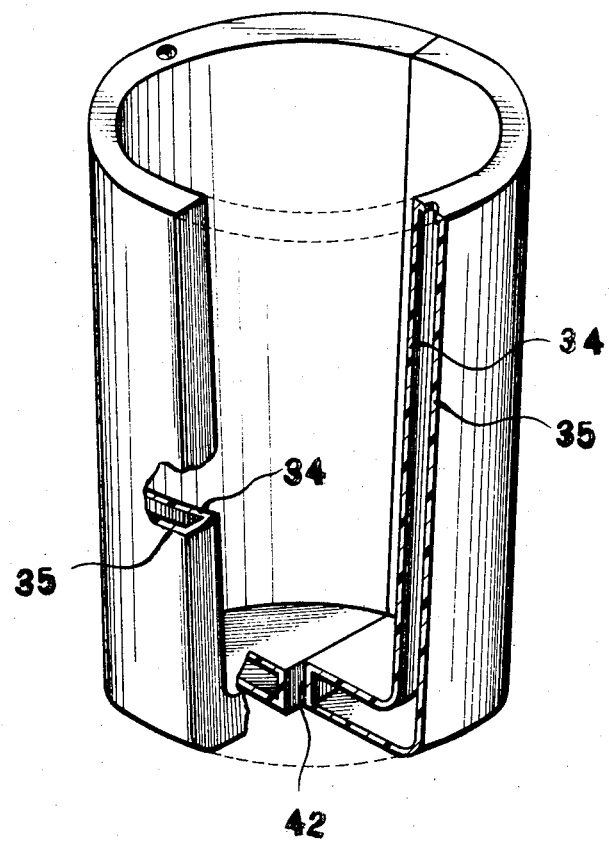
FIG. 10 is an enlarged perspective view, partially broken away, of the container.

Thus, with the method and apparatus illustrated in the FIGS. 1 to 4, there is provided, in one blow-molding operation, a hollow, double-walled plastic container formed with two parisons and having welding or mating part 42 as shown in FIGS. 5 to 10. The welding or mating part 42 serves as an essential part which is capable of reinforcing the container and which separates inner and outer shells 34 and 35 of the container to maintain spaces therebetween. The said FIG. 5 shows a plan view of the container, and FIGS. 6 to 9 illustrate sections taken along the appropriate line in FIGS. 5 and 6, while FIG. 10 being a perspective view partially broken away.

It will be appreciated that the method and apparatus according to the present invention may provide with various molding articles by altering the configuration of the cavity 27, i.e., the recesses 36 of the half-molds 14A and 14B and outline of the core 15 in accordance with the contour of the desirable article to be produced.

Figure 11:
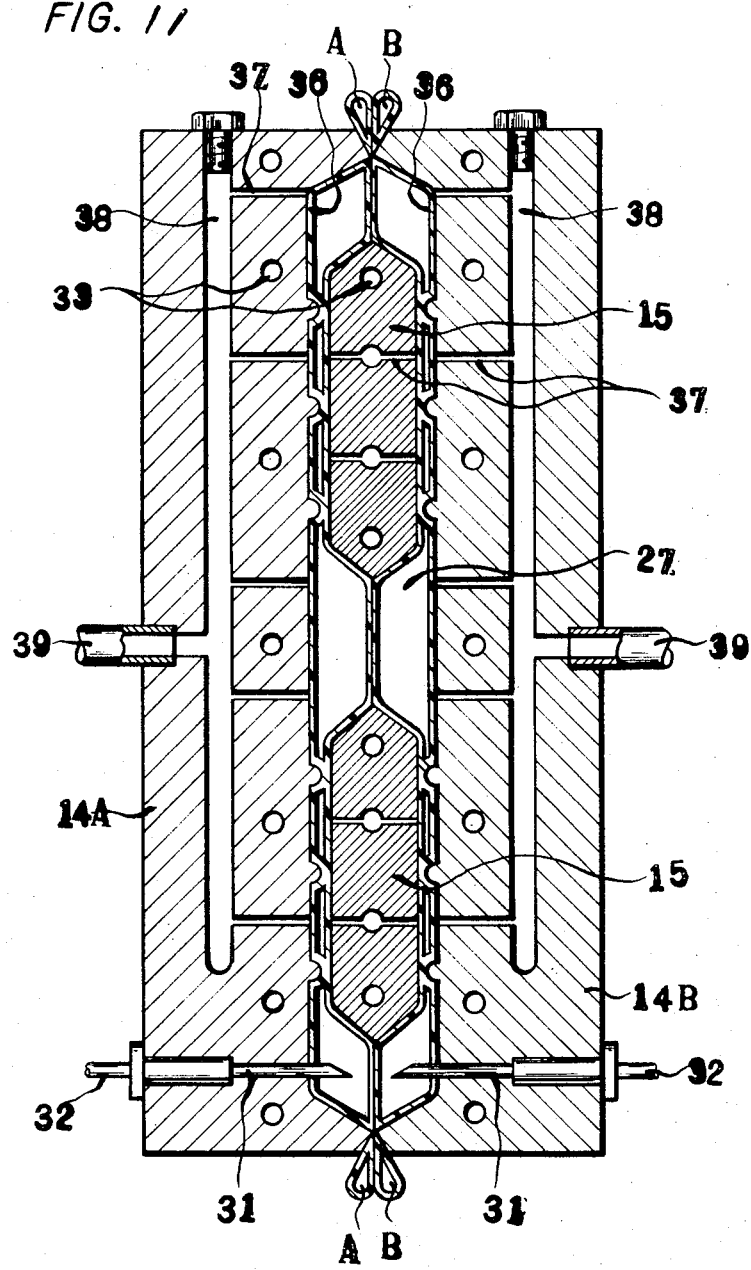
FIG. 11 is a cross sectional view, on an enlarged scale, of other modified mold of the apparatus according to the invention, the mold being adapted to product a palette.
Figure 12:
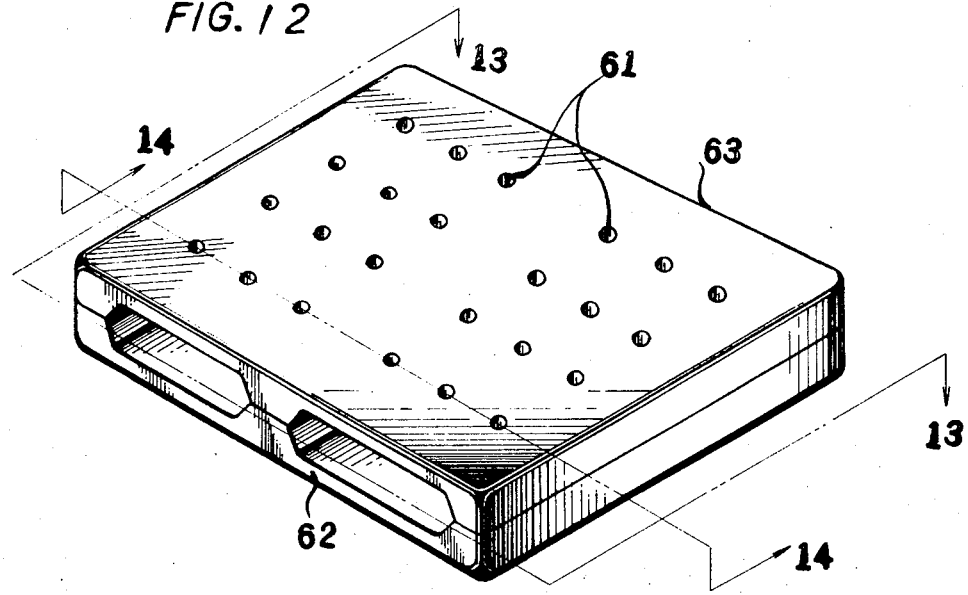
FIG. 12 is a perspective view of the palette.
Figure 13:
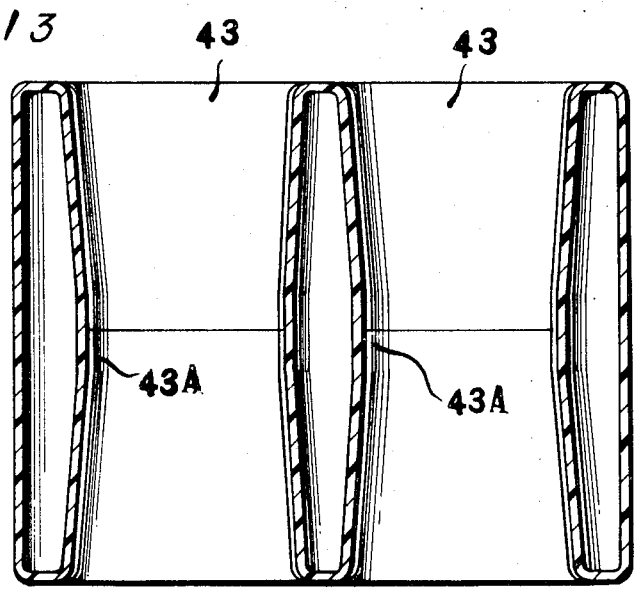
FIG. 13 is a cross-sectional view of the palette taken along the line 13—13 in FIG. 12.
Figure 14:
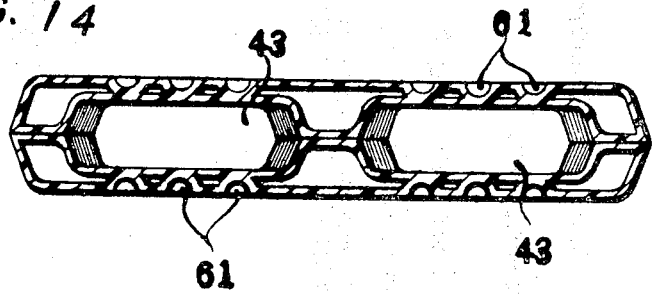
FIG. 14 is a vertical sectional view of the palette taken along the line 14—14 in FIG. 12.

FIG. 11 illustrates a modified mold according to the invention for manufacturing a hollow, double-walled plastic palette as shown in FIGS. 12, 13 and 14. This palette is provided with a pair of oblong, flat-sides holes 43 opened on the opposited side surface thereof, which are adapted to insert forks (not shown) of the lift or the like. The holes 43 are formed in parallel to each other and being extended from one side surface 62 to the opposited side surface 63. Each of the holes 43 has at intermediate portion between end openings thereof a reduced portion 43A which provides close engagement between the hole and inserted fork of the lift. In the FIG. 11 showing the mold for producing the palette, like numerals are employed to designate similar parts to the FIG. 3. The mold of the second embodiment, however, is provided with a pair of cores 15, instead of single stational core of the first embodiment illustrated in FIG. 3, and each core being of two sections separably assembled by suitable means (not shown). The recesses 36 of the half molds 14A and 14B and outer configuration of the cores 15 define a chamber or cavity 27 corresponding to the contour of the palette. In the illustrated palette, the inner and the outer walls thereof much closely, approaches to each other, and they being welded together at spaced locations 61 for reinforcing the palette, althrough this need not necessarily be done. Where welding is desired, the half-molds 14A, 14B and the cores 15 are shaped accordingly.

Figure 18:
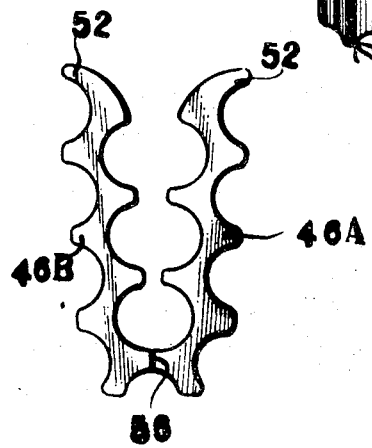
FIG. 18 is a plan view of the core in the natural condition thereof.

According to the present invention a hollow, double-walled caddy bag provided with complicated construction as shown in FIGS. 15 to 19 also can be easily obtained. The caddy bag comprises two blow-molding members, i.e., an outer member or housing 45 having an integral handle 55 and an inserted core member 46, each member being capable of molding in one operation with the similar manner to the above-mentioned method. In this way, it is natural that the mold for each member should be shaped in accordance with the contour of the appropriate member. The outer member or housing 45 is provided with a number of vertically elongated, semi-circular recesses 47 in the inner surface thereof and being gradually tapered down. Formed at the intermediate part of inner surface of the housing 45 is a circular flange 48 which is adapted for receipt of the lower edge of the core member 46. The core member also is provided with a number of vertically elongated, semi-circular recesses 50 on the outer surface thereof and has, in folded condition thereof, a plurality of axially elongated holes 49. The said recesses 50 opposing the recesses 47 of the housing, respectively, to provide a number of holes 51 as the core member 46 is inserted in the housing 45 as shown in FIGS. 15 and 19. The core member 46 is tapered corresponding to the interior of the housing and comprising two sections 46A and 46B, one of which is formed of one parison and other of another parison. The both sections 46A and 46B are welded one another at a welding portion 56 which is formed at one edge along the longitudinal direction of the core member. Opposited edges 52 of the sections 46A and 46B are spaced apart from each other as shown in FIG. 18, so that, when the core member 46 is inserted into the interior of the housing 45 under the folded condition (FIG. 17), projected portions 53 on the outer surface of the core member are brought into close and strong contact with opposite projections 54 on the inner surface of the housing 45 without use of any adhesive agents or the like.

Figure 16:
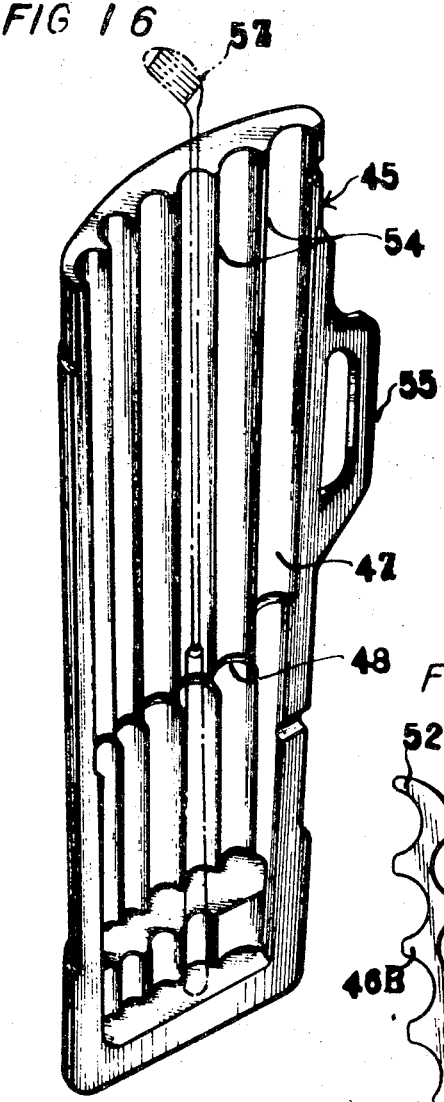
FIG. 16 is a perspective view of half part of a housing of the caddy bag.
Figure 17:
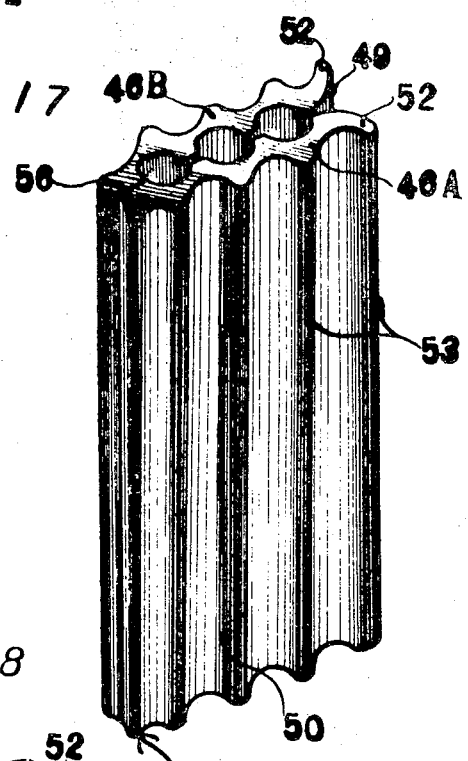
FIG. 17 is a perspective view of a core member of the caddy bag, showing the foled condition thereof.

The holes 49 and 51 are adapted to carry golf clubs 57 (FIG. 16). As shown in FIG. 15 and 19, there is provided with an open-topped, elongated space 64 for the miscellaneous thing, for example, such as golf-balls, towels or the like. The said space 64 may be formed at any desired position or be omitted by modifying the appropriate molds, if desired.

With above construction, the caddy bag is capable of being produced lightly and economically while the contained golf-clubs being not brought into contact with each other since the golf-clubs are supported by the holes, respectively, thereby preventing the golf-clubs from being hurt.

Figure 20:
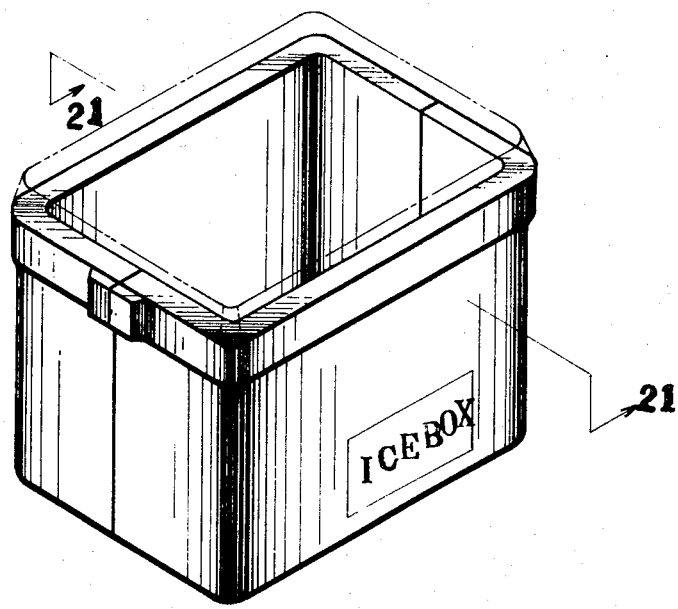
FIG. 20 is a perspective view of the other article embodied as an ice-box in accordance with the present invention.
Figure 22:
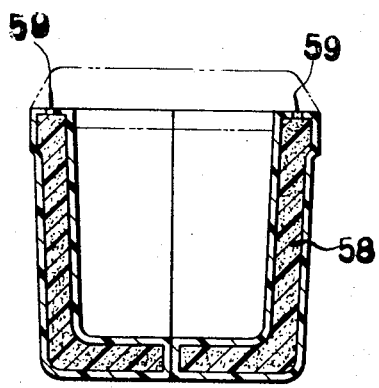
FIG. 22 is a vertical sectional view of the other embodiment of the ice-box in which the foamy plastic material is injected between inner and outer walls thereof.
Figure 21:
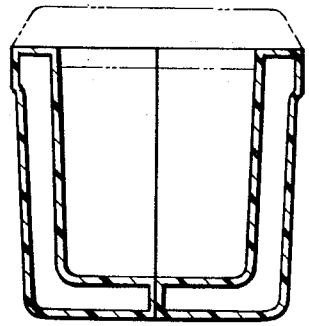
FIG. 21 is a vertical sectional view of the ice-box taken along the line 21—21 in FIG. 20.

FIGS. 20 and 21 show an another embodiment of the container in the form of an ice box which is also produced by the above-mentioned method and apparatus with the appropriate mold, and FIG. 22 illustrating an another embodiment of the ice box in which foamy internal composition 58 of plastic material, for example, such as polyethylene, polypropylene, polystyrene, polyurethane or the like is injected between inner and outer walls through openings 59 by conventional manner, thereby providing with more durability and resistance against deformation and further enhancing adiabatic effect thereof.

The subject invention in its broader aspects is not limited only to the specific embodiments shown and described but departures may be made therefrom within the scope of the accompanying claims without departing from the principles of the invention and without sacrificing its chief advantages.

What I claim is:

1. An elongated, hollow, open-topped double-walled article of plastics material comprising at least two hollow, double-walled one-piece parts, each of the parts having
   a. spaced-apart inner and outer walls, each of the inner and outer walls having a generally horizontally extending bottom portion and a generally upwardly extending side wall portion integrally joined to a peripheral edge portion of the said bottom portion, the bottom portion of each of the inner and outer walls having a generally horizontally extending edge, the side wall portion of each of the inner and outer walls having a pair of upwardly extending end edges and a top edge, the end edges of the inner and outer side wall portions extending upwardly from the ends of the respective horizontally extending edges of the bottom portion inner and outer walls,
   b. a generally U-shaped substantially planar wall having a pair of spaced-apart generally upwardly extending portions and a generally horizontally extending bottom portion, the generally horizontally exending bottom portion of the U-shaped end wall extending between the horizontally extending edges of the bottom portions of the inner and outer walls and being integrally joined thereto, each of the upwardly extending portions of the U-shaped end walls extending between upwardly extending edges of the side wall portions of the inner and outer walls and being integrally joined thereto, and
   c. a top wall extending between the top edges of the side wall portions of the inner and outer walls and being integrally joined thereto,
   the generally U-shaped wall of each part being welded to the generally U-shaped wall of another part.

2. The article of claim 1 in which the space between the inner and outer walls of each part is filled with a foamed plastic.

* * * * *